United States Patent
Yamauchi et al.

(10) Patent No.: US 9,477,434 B2
(45) Date of Patent: Oct. 25, 2016

(54) IMAGE FORMING APPARATUS, JOB EXECUTION SYSTEM, AND JOB EXECUTION METHOD

(71) Applicant: Konica Minolta, Inc., Chiyoda-ku, Tokyo (JP)

(72) Inventors: Kana Yamauchi, Toyohashi (JP); Kaoru Fukuoka, Toyokawa (JP); Tomoyuki Atsumi, Toyohashi (JP); Hiroshi Sugiura, Aichi-ken (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/708,499

(22) Filed: May 11, 2015

(65) Prior Publication Data

US 2015/0242170 A1   Aug. 27, 2015

Related U.S. Application Data

(62) Division of application No. 12/398,232, filed on Mar. 5, 2009, now Pat. No. 9,052,856.

(30) Foreign Application Priority Data

Jun. 18, 2008   (JP) .................................. 2008-159503

(51) Int. Cl.
  *G06K 15/00*   (2006.01)
  *G06F 7/04*   (2006.01)
  (Continued)

(52) U.S. Cl.
  CPC ........... *G06F 3/1238* (2013.01); *G06F 3/1222* (2013.01); *G06F 3/1288* (2013.01);
  (Continued)

(58) Field of Classification Search
  CPC .... G06F 3/1237; G06F 3/1238; G06F 3/122; G06F 3/1285; G06F 3/1288; G06F 21/608; H04N 1/00954; H04N 1/00957; H04N 29/06823; H04N 29/0685
  USPC ........................ 715/273–277, 700, 809, 808; 358/1.11–1.18, 1.9, 400–404, 2.1
  See application file for complete search history.

(56) References Cited

U.S. PATENT DOCUMENTS 7,684,064 B2   3/2010   Kimura et al.
7,804,752 B2   9/2010   Weirauch
(Continued)

FOREIGN PATENT DOCUMENTS

JP   2001-331234 A   11/2001
JP   2007-166225 A   6/2007
(Continued)

*Primary Examiner* — Chad Dickerson
(74) *Attorney, Agent, or Firm* — Buchanan Ingersoll & Rooney PC (57) ABSTRACT

An image forming apparatus includes: a receiving portion that receives an authentication print job sent by a user; a comparison portion that compares identification information received through the user's input with identification information included in image data; a job execution portion that executes the authentication print job in the case where the comparison between the received identification information and the identification information included in the image data has succeeded; and a password storage portion that stores identification information in the case where the authentication print job is in the process of being received in order to enable the comparison made by the comparison portion with respect to the authentication print job that is being received.

15 Claims, 8 Drawing Sheets

(51) Int. Cl.
*G06F 3/12* (2006.01)
*G06F 21/60* (2013.01)
*H04N 1/00* (2006.01)

(52) U.S. Cl.
CPC ........ *G06F21/608* (2013.01); *H04N 1/00957* (2013.01); *H04N 2201/0094* (2013.01); *H04N 2201/3235* (2013.01)

(56) References Cited

U.S. PATENT DOCUMENTS

| | | | |
|---|---|---|---|
| 7,817,291 B2 | 10/2010 | Ohmori | |
| 7,865,725 B2 | 1/2011 | Choi | |
| 2004/0186925 A1* | 9/2004 | Cooper | G06F 9/4868 710/8 |
| 2005/0105121 A1 | 5/2005 | Hirano | |
| 2005/0254070 A1* | 11/2005 | Sayama | G06F 21/608 358/1.1 |
| 2006/0007471 A1* | 1/2006 | Okamoto | H04N 1/32133 358/1.14 |
| 2006/0274355 A1 | 12/2006 | Ferlitsch et al. | |
| 2007/0022467 A1* | 1/2007 | Filbrich | G06F 21/608 726/2 |
| 2008/0007759 A1* | 1/2008 | Furuyama | G06F 21/608 358/1.14 |
| 2009/0174890 A1 | 7/2009 | Shigehisa et al. | |

FOREIGN PATENT DOCUMENTS

| | | | |
|---|---|---|---|
| JP | 2007166225 A | * | 6/2007 |
| JP | 2007-251634 A | | 9/2007 |

* cited by examiner

IMAGE FORMING APPARATUS, JOB EXECUTION SYSTEM, AND JOB EXECUTION METHOD

This is a Division of application Ser. No. 12/398,232 filed on Mar. 5, 2009, which claims the benefit of Japanese Application No. 2008-159503 filed on Jun. 18, 2008. The disclosure of the prior applications is hereby incorporated by reference herein in their entirety.

BACKGROUND OF THE INVENTION

1. Field of the Invention

The present invention relates to an image forming apparatus such as an MFP, a job execution system, and a job execution method.

2. Description of the Related Art

In addition to image forming apparatuses that form images, such as copiers, printers, and facsimiles, multi-function devices called MFPs (Multi Function Peripherals) have conventionally been used in company offices and the like.

Recently, controlling information processing devices (i.e. personal computers) to operate only when an IC card has been inserted in the device has been proposed as a technique for preventing unauthorized access (see Japanese Patent Laid-Open No. 2001-331234).

A sensitive document printing method is an example of a method to which such a technique is applied. In this method, when an authentication print job has been sent to an image forming apparatus from a terminal device, the user that sent the job inputs a user ID and password using an operation panel of the image forming apparatus. If the authentication process is a success, the print output commences. Note that "authentication print job" refers to a print job that is executed when the user that sent the print job from a terminal device to an image forming apparatus has performed a predetermined authentication operation using an operation panel of the image forming apparatus and that authentication process has succeeded.

In addition to the case where the authentication process is executed by the user inputting a user ID and a password via an operation panel, there are also cases where the user performs a predetermined operation using an authentication apparatus, such as an IC card authentication apparatus or a finger vein authentication apparatus, thereby executing an authentication process. Furthermore, there are cases where the user performs authentication by inputting the job ID of the authentication print job along with a password, thereby executing the authentication print job.

However, the authentication process is not executed in the case where the user that sent the authentication print job performs a predetermined authentication operation using the image forming apparatus but the authentication print job has not yet been received, or in other words, is in the process of being received. For this reason, it is necessary for the user to wait for time to pass and then once again perform the authentication operation, which is extremely troublesome.

SUMMARY

Having been achieved in light of such problems, it is an object of the present invention to make it possible to perform print output with less trouble than is conventionally possible.

According to one aspect of the present invention, an image forming apparatus is configured to execute an authentication print job that is to be executed based on an authentication result. The image forming apparatus includes a receiving portion receiving the authentication print job sent by a user, an image data storage portion storing image data of the authentication print job, an accepting portion receiving first identification information, the first identification information being inputted by the user, a comparison portion performing comparison between the first identification information and second identification information, the second identification information being included in the image data stored in the image data storage portion, a job execution portion executing the authentication print job when the comparison has shown that the first identification information matches the second identification information, an identification information storage portion storing the first identification information, and a controller causing, when the authentication print job is being received by the receiving portion, the identification information storage portion to store the first identification information to enable the comparison portion to perform the comparison on the authentication print job that is being received.

Preferably, the identification information storage portion may store the first identification information until the receiving portion has completed reception of the authentication print job.

Further, the image forming apparatus may include a display portion displaying, when the authentication print job is being received by the receiving portion, a message indicating that the comparison portion repeats the comparison after completion of reception of the authentication print job.

DESCRIPTION OF THE PREFERRED EMBODIMENTS

The following describes a case in which an image forming apparatus, called an MFP or Multi Function Peripheral, which is a processing device that integrates a variety of functions, such as copying, scanning, faxing, network printing, document server functionality, is used.

Figure 1:
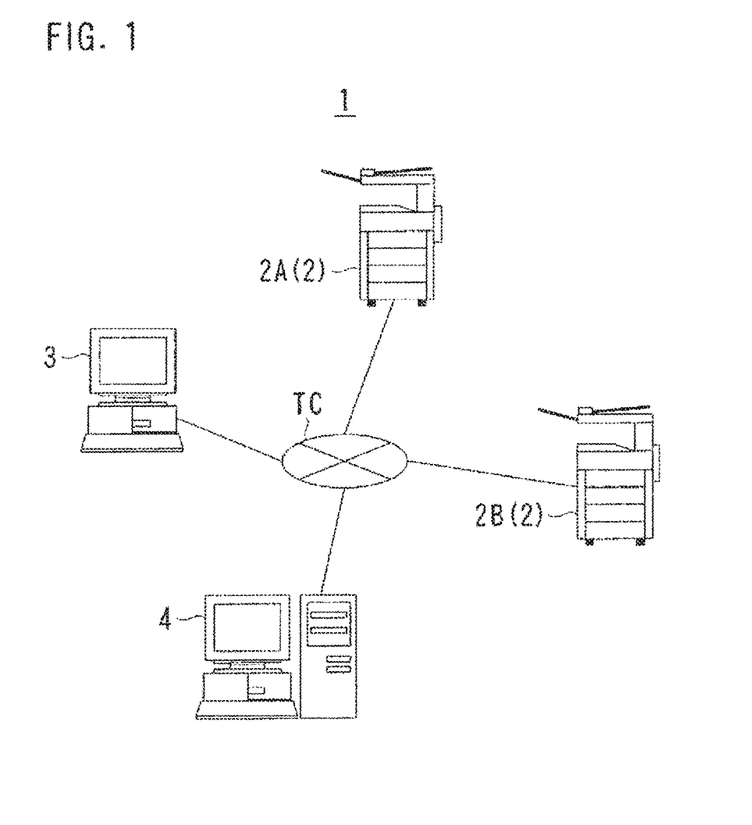
FIG. 1 is a diagram illustrating an example of the overall configuration of a job execution system.
Figure 2:
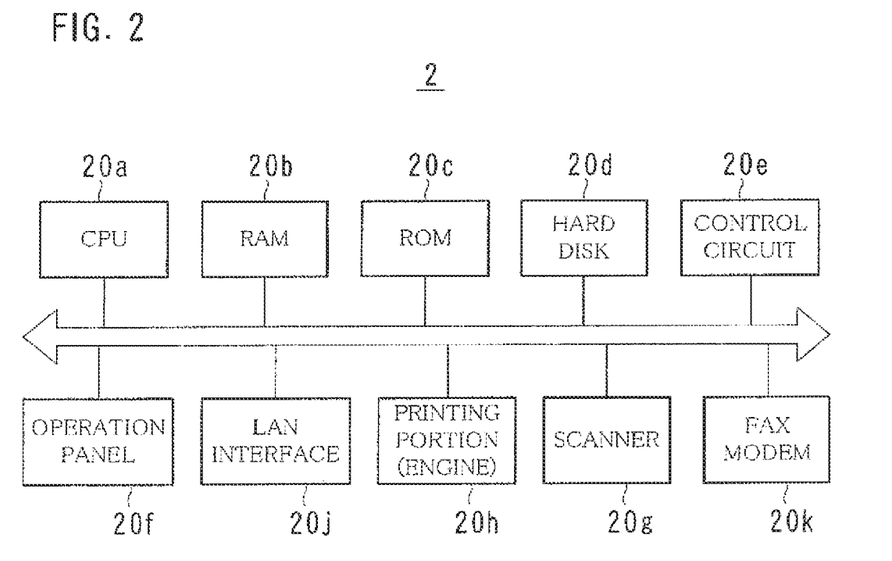
FIG. 2 is a diagram illustrating an example of the hardware configuration of an image forming apparatus.
Figure 3:
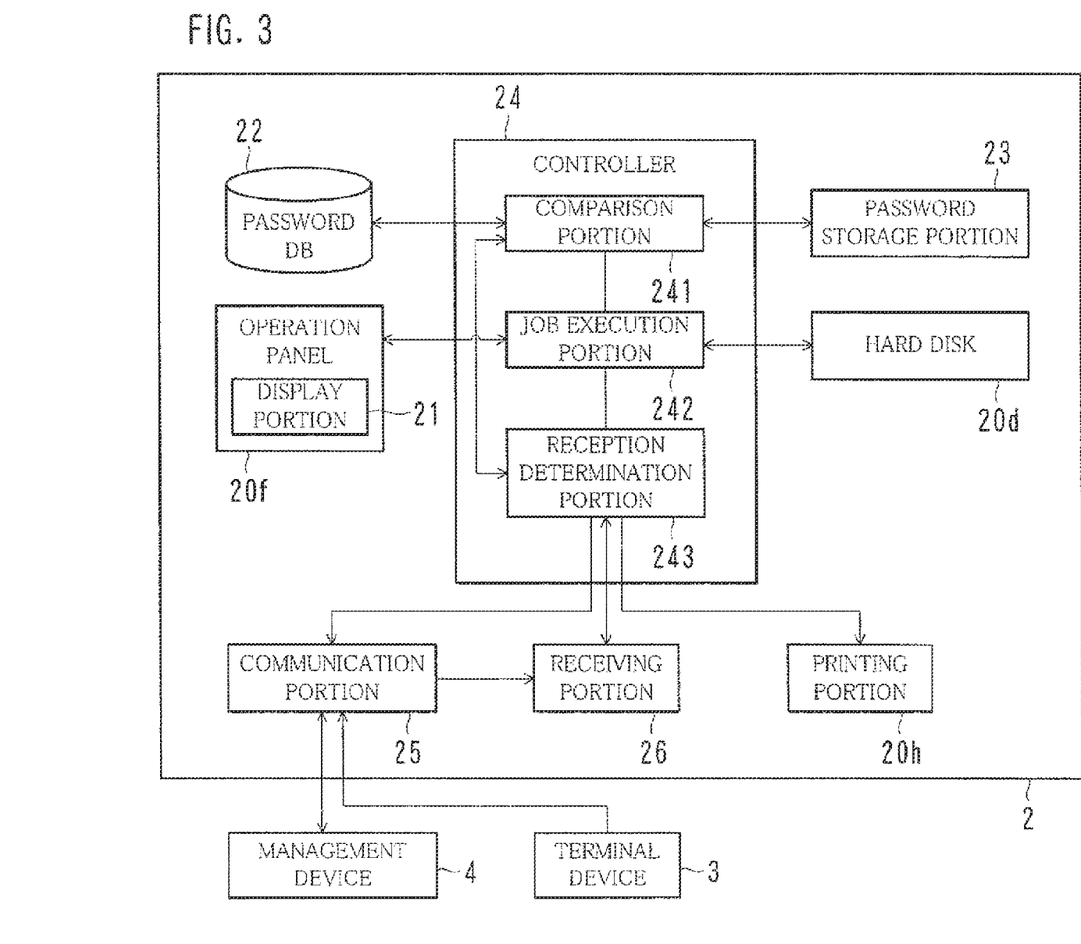
FIG. 3 is a diagram illustrating an example of the functional configuration of an image forming apparatus.
Figure 4:
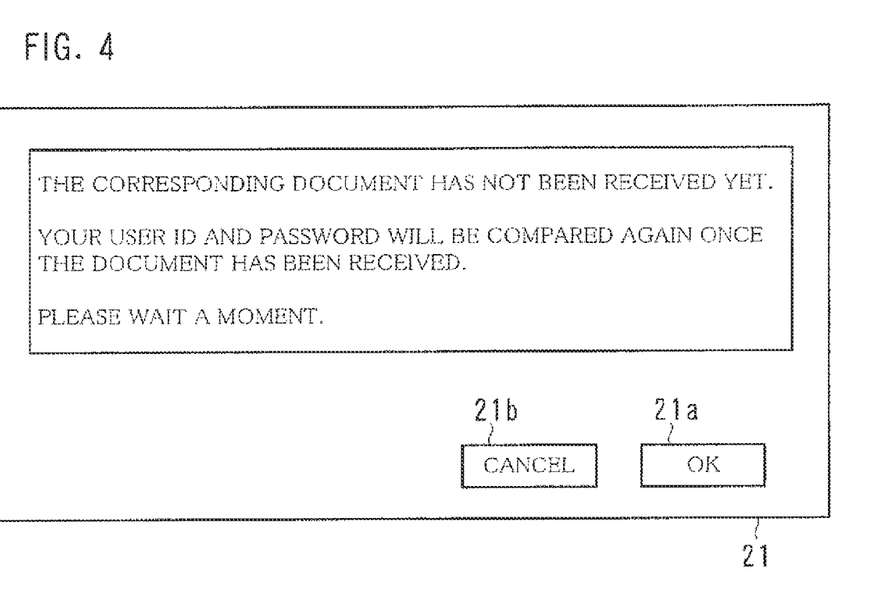
FIG. 4 is a diagram illustrating an example of a warning screen displayed in a display portion of an operation panel.

FIG. 1 is a diagram illustrating an example of the overall configuration of a job execution system 1; FIG. 2 is a diagram illustrating an example of the hardware configuration of an image forming apparatus 2; FIG. 3 is a diagram illustrating an example of the functional configuration of the image forming apparatus 2; and FIG. 4 is a diagram illustrating an example of a warning screen displayed in a display portion 21 of an operation panel 20f.

As shown in FIG. 1, the job execution system 1 is configured of multiple image forming apparatuses 2 (2A, 2B, and so on), a terminal device 3, a management device (server) 4, a communication line TC, and so on. A LAN, the Internet, a public line, a dedicated line, or the like may be used as the communication line TC. In such a job execution system 1, the image forming apparatuses 2, the terminal device 3, and the management device 4 are connected to one another via the communication line TC.

The terminal device 3 is a client of the image forming apparatuses 2, and is a device for using scanner, fax, box, PC printing, and other functions provided by the image forming apparatuses 2.

Each image forming apparatus 2 can be installed in the office of a public body (a governmental body, a local authority, or the like) or a business, a public facility such as a school or a library, or in other locations, and can be shared by multiple users.

As shown in FIG. 2, each image forming apparatus 2 is configured of a CPU 20a, a RAM 20b, a ROM 20c, a hard disk 20d, a control circuit 20e, the operation panel 20f, a scanner 20g, a printing portion (engine) 20h, a LAN interface 20j, a fax modem 20k, and the like.

The control circuit 20e is a circuit for controlling the hard disk 20d, the operation panel 20f, the scanner 20g, the printing portion 20h, the LAN interface 20j, and the fax modem 20k.

The scanner 20g optically reads an image of content such as text, equations, symbols, photographs, diagrams, and illustrations written on a document, and generates image data thereof.

The printing portion 20h prints an image based on the image data obtained by the scanner 20g onto a recording medium such as paper.

The LAN interface 20j is a NIC (Network Interface Card) for communicating with other image forming apparatuses 2, and is used to connect the image forming apparatus 2 to a hub or a router.

The fax modem 20k is a device for communicating with another image forming apparatus 2, a fax terminal, or the like through a fax protocol.

The operation panel 20f is configured of the display portion 21, which is in turn configured of a touch panel-type liquid-crystal display and shall be described later, and an operation portion (not shown) configured of a numerical keypad and the like. A screen for providing messages, instructions, and the like to a user, a screen through which the user inputs his or her desired type of process and processing conditions, and a screen for displaying the results of processes executed by the CPU 20a and the like are examples of screens displayed in the display portion 21.

By operating the display portion 21 or the operation portion while viewing the abovementioned screens, the user can provide instructions to the image forming apparatus 2 to commence or stop the execution of processing, specify processing conditions such as the destination of data, printing conditions, or scanning conditions, and specify various other items. In other words, the operation panel 20f plays the role of a user interface by which the user operates the image forming apparatus 2.

As shown in FIG. 3, each image forming apparatus 2 is configured of a password database 22, a password storage portion 23, a controller 24, a communication portion 25, and a receiving portion 26. The controller 24 includes a comparison portion 241, a job execution portion 242, and a reception determination portion 243. These constituent elements are realized by the abovementioned CPU 20a, RAM 20b, ROM 20c, or other such circuit elements. A computer program for implementing the various functions of these constituent elements is stored in the RAM 20b, the ROM 20c, or the like.

First, the receiving portion 26 receives an authentication print job from the terminal device 3 via the communication portion 25. The authentication print job is a print job executed when the user that sent the print job (image data, print instructions, and so on) from the terminal device 3 to the image forming apparatus 2 has performed a predetermined authentication operation (inputting a user ID and password, a job ID and password, or the like) through the operation panel 20f or an authentication device such as a biometric authentication device provided in the image forming apparatus 2 and that authentication process has been successful.

The controller 24 stores the image data relating to the authentication print job received by the receiving portion 26 in the hard disk 20d.

Here, the image data relating to the authentication print job includes a user ID, which is user identification information, and a password. In other words, the user ID, password, and a body (main data) make up a single piece of image data. The user ID and password are embedded at the top of the image data, and the body is attached thereafter.

Therefore, the receiving portion 26 receives the user ID and password included in the image data sent from the terminal device 3 first, and then receives the body thereafter.

The controller 24 causes an input screen, for the user to input his or her user ID and password, to be displayed in the display portion 21.

The controller 24 then checks whether or not the user has inputted his or her user ID and password through the operation panel 20f. If the user ID and password have been inputted by the user, the comparison portion 241 determines whether or not the image data corresponding to the inputted user ID and password is stored in the hard disk 20d.

Then, if the image data corresponding to the inputted user ID and password is stored in the hard disk 20d, the job execution portion 242 causes the printing portion 20h to print an image based on that image data onto paper.

However, if image data corresponding to the inputted user ID and password is not yet stored in the hard disk 20d, the reception determination portion 243 checks whether or not the receiving portion 26 is in the process of receiving image data.

In the case where the receiving portion 26 is in the process of receiving image data, the controller 24 stores the user ID and password inputted by the user in the password database 22 and the password storage portion 23.

Furthermore, when the reception of image data by the receiving portion 26 has been completed, or when the user ID and password information included in image data has been received despite the receiving portion 26 being in the process of receiving that image data, the comparison portion 241 compares the user ID and password received by the receiving portion 26 with the user IDs and passwords stored in the password storage portion 23.

Here, as described above, because the receiving portion 26 receives the user ID and password included in the image data sent from the terminal device 3 prior to receiving the body, the comparison portion 241 can perform the comparison even if the image data has not been completely received by the receiving portion 26.

Note that in the present embodiment, image data is sent using PJL commands. PJL is a printing command language (developed by Hewlett Packard) that provides functionality for controlling print jobs that are being processed by a printing device. Through this, it can be understood that the sending of the user ID, password, and body has commenced, and thus it can also be understood that the reception of the user ID and password has been completed. The comparison portion 241 can therefore carry out the comparison.

In the case where the user ID and password received by the receiving portion 26 match a user ID and password stored in the password storage portion 23, the controller 24 causes the printing portion 20h to print an image based on the stated image data onto paper.

Here, in the case where the image data is in the process of being received, the controller 24 causes a message to be displayed in the display portion 21, indicating that the image data has not been completely received and that the user ID and password comparison will be performed again once the image data has been completely received; this message is illustrated in FIG. 4. In this case, the user presses an OK button 21a upon visually checking the display portion 21. However, in the case where the user does not wish to carry out the user ID and password comparison after the image data has been completely received by the receiving portion 26, s/he presses a cancel button 21b. Doing so cancels the authentication print job.

Figure 5:
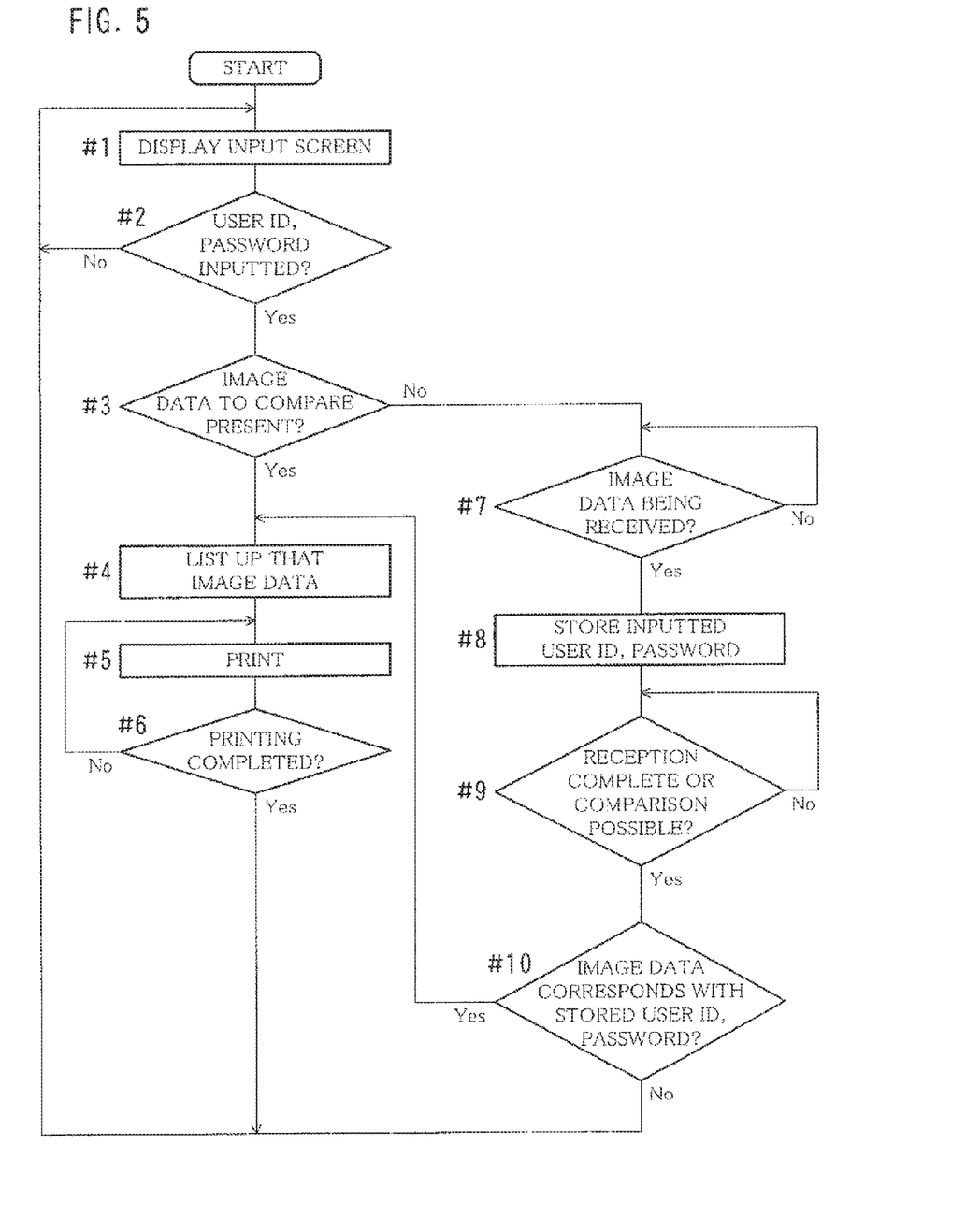
FIG. 5 is a flowchart illustrating an example of the flow of a job execution process according to an embodiment of the present invention.

FIG. 5 is a flowchart illustrating an example of the flow of a job execution process according to the present embodiment.

As shown in FIG. 5, first, the user ID and password input screen is displayed in the display portion 21 (#1). When a user ID and password have been inputted by the user (Yes in #2), it is determined whether or not image data corresponding to the inputted user ID and password is stored in the hard disk 20d (#3).

In the case where corresponding image data is stored in the hard disk 20d (Yes in #3), the target image data is listed up (#4), and images based on that image data are printed onto paper (#5). In the case where the printing is not complete (No in #6), the printing process of #5 is continued.

Meanwhile, in the case where corresponding image data is not stored in the hard disk 20d (No in #3), it is determined whether or not image data is in the process of being received (#7).

In the case where image data is in the process of being received (Yes in #7), the user ID and password inputted in #2 are stored (held) (#8).

Then, in the case where the reception of the image data has been completed or the apparatus has entered a state in which it is capable of comparison, or in other words, in the case where the user ID and password information included in the image data has been received (Yes in #9), it is determined whether or not the received image data corresponds to the user ID and password stored in #8 (#10).

In the case where the received image data corresponds (Yes in #10), the aforementioned processes of #4, #5, and #6 are executed. However, in the case where the received image data does not correspond (No in #10), the process returns to #1. Note that the process may also return to #7 after the process of #10 (No in #10), rather than returning to #1.

Figure 6:
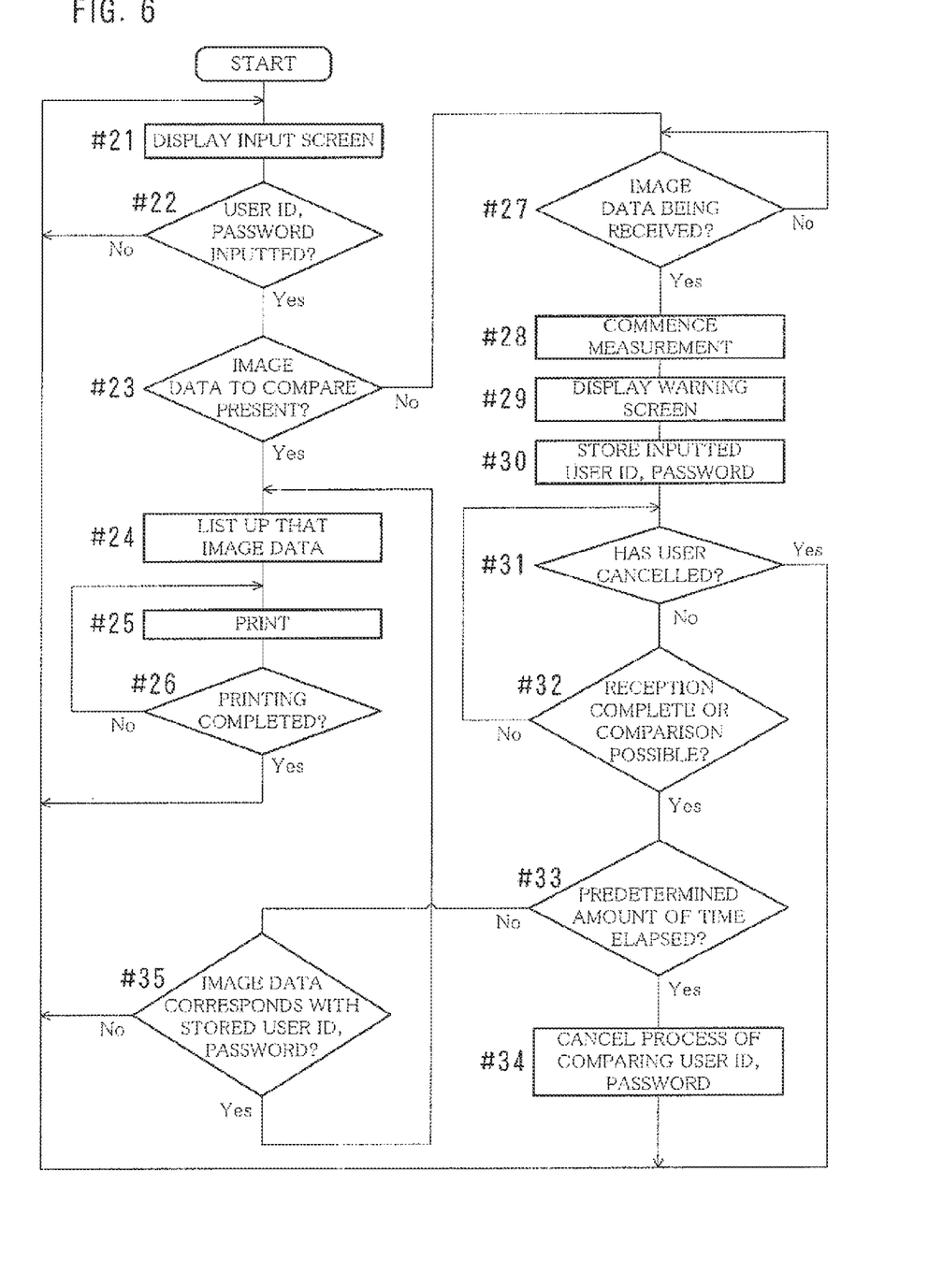
FIG. 6 is a flowchart illustrating another example of the flow of a job execution process according to an embodiment of the present invention.

FIG. 6 is a flowchart illustrating another example of the flow of a job execution process according to the present embodiment.

In FIG. 6, the processes of #21 to #26 are the same as the aforementioned processes of #1 to #6. In other words, first, the user ID and password input screen is displayed in the display portion 21 (#21). When a user ID and password have been inputted by the user (Yes in #22), it is determined whether or not image data corresponding to the inputted user ID and password is stored in the hard disk 20d (#23).

In the case where corresponding image data is stored in the hard disk 20d (Yes in #23), the target image data is listed up (#24), and images based on that image data are printed onto paper (#25). In the case where the printing is not complete (No in #26), the printing process of #25 is continued.

Meanwhile, in the case where corresponding image data is not stored in the hard disk 20d (No in #23), it is determined whether or not image data is in the process of being received (#27).

In the case where image data is in the process of being received (Yes in #27), the controller 24 begins measuring time (#28). The warning screen mentioned above with reference to FIG. 4 is then displayed in the display portion 21 (#29).

Next, the user ID and password inputted in #22 are stored (held) (#30).

Here, in the case where the cancel button 21b has been pressed by the user (Yes in #31), the process returns to #21. However, in the case where the cancel button 21b has not been pressed by the user (No in #31), it is determined whether or not the reception of the image data has been completed or the apparatus has entered a state in which it is capable of comparison, or in other words, if the user ID and password information included in the image data has been received (#32).

In the case where the image data has been completely received, or the case where the user ID and password information included in the image data has been received (Yes in #32), it is determined whether or not a predetermined amount of time has elapsed since the controller 24 commenced the measurement (#33).

In the case where the predetermined amount of time has elapsed since the controller 24 commenced the measurement (Yes in #33), the process for comparing the user ID and password is cancelled (#34), and the process returns to #21.

However, in the case where the predetermined amount of time has not elapsed since the controller 24 commenced the measurement (No in #33), it is determined whether or not the received image data corresponds to the user ID and password stored in #30 (#35).

In the case where the received image data corresponds (Yes in #35), the aforementioned processes of #24, #25, and #26 are executed. However, in the case where the received image data does not correspond (No in #35), the process returns to #21. Note that the process may also return to #27 after the process of #35 (No in #35), rather than returning to #21.

EFFECTS OF THE PRESENT EMBODIMENT

In the present embodiment, even if, when the user that has sent an authentication print job from the terminal device 3 to the image forming apparatus 2 inputs his or her user ID and password using the operation panel 20f, the image forming apparatus 2 has not yet commenced the reception of the image data relating to that authentication print job, or the reception of that image data has not yet been completed, the inputted user ID and password information is not discarded. Instead, the inputted user ID and password are held (stored) until the comparable information included in the image data, or in other words, the user ID and password, are received.

The comparison process is executed once again when the user ID and password can be received.

According to such a method, the user does not need to input his or her user ID and password again.

Therefore, in the case where the image data relating to an authentication print job has not yet been received when the user has performed a predetermined authentication operation, the print output can be carried out with less trouble than with the conventional method, in which the authentication information based on the authentication operation is discarded.

Furthermore, because it is not necessary to input the user ID and password again, the chance of the user sustaining mental stress such as annoyance or anxiety is lessened.

Other Embodiments

In the above embodiment, a user ID and password are inputted as identification information when performing an authentication process for an authentication print job. However, as described hereinafter, a job ID and password may be inputted as well.

Figure 7:
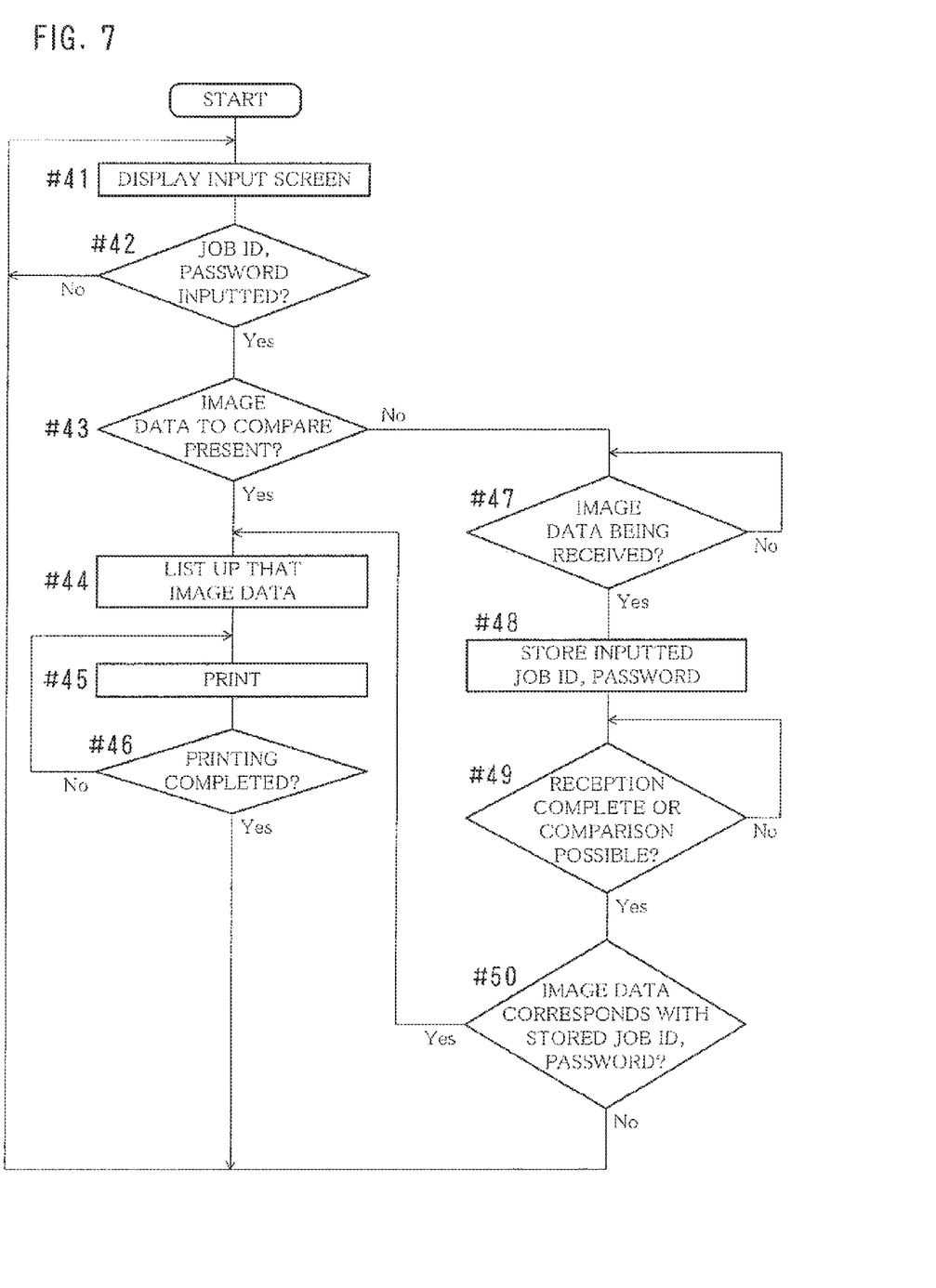
FIG. 7 is a flowchart illustrating yet another example of the flow of a job execution process according to an embodiment of the present invention.

FIG. 7 is a flowchart illustrating another example of the flow of a job execution process according to the present embodiment.

As shown in FIG. 7, a job ID and password input screen is displayed in the display portion 21 (#41). When a job ID and password have been inputted by the user (Yes in #42), it is determined whether or not image data corresponding to the inputted job ID and password is stored in the hard disk 20d (#43).

In the case where corresponding image data is stored in the hard disk 20d (Yes in #43), the target image data is listed up (#44), and images based on that image data are printed onto paper (#45). In the case where the printing is not complete (No in #46), the printing process of #45 is continued.

Meanwhile, in the case where corresponding image data is not stored in the hard disk 20d (No in #43), it is determined whether or not image data is in the process of being received (#47).

In the case where image data is in the process of being received (Yes in #47), the job ID and password inputted in #42 are stored (held) (#48).

Then, in the case where the reception of the image data has been completed or the apparatus has entered a state in which it is capable of comparison, or in other words, in the case where the job ID and password information included in the image data has been received (Yes in #49), it is determined whether or not the received image data corresponds to the job ID and password stored in #48 (#50).

In the case where the received image data corresponds (Yes in #50), the aforementioned processes of #44, #45, and #46 are executed. However, in the case where the received image data does not correspond (No in #50), the process returns to #41. Note that the process may also return to #47 after the process of #50 (No in #50), rather than returning to #41. Furthermore, although the image data listed up in the process of #44 may be printed as-is, it is also possible to first display that data in a screen and allow the user to select the data to print.

Figure 8:
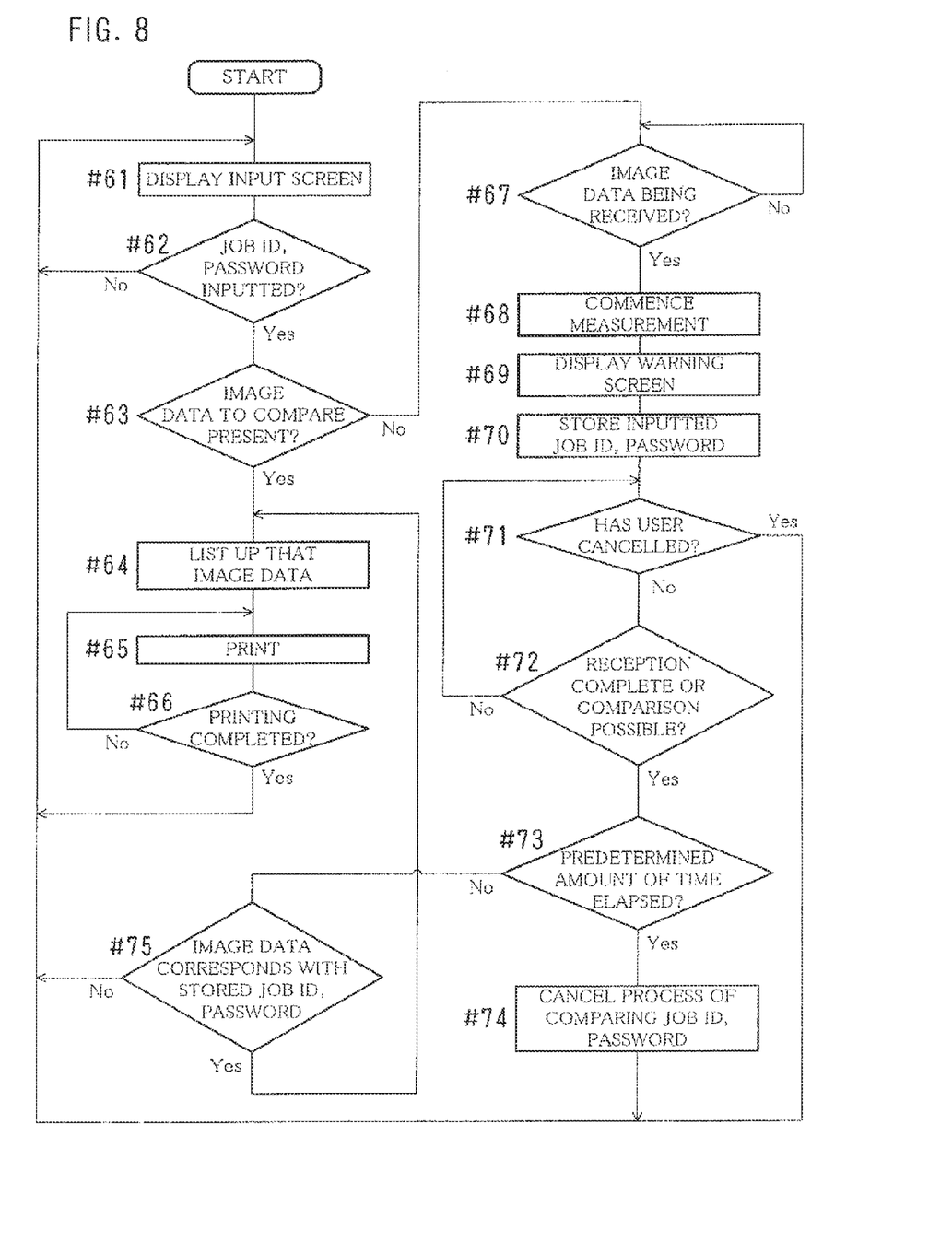
FIG. 8 is a flowchart illustrating yet another example of the flow of a job execution process according to an embodiment of the present invention.

FIG. 8 is a flowchart illustrating another example of the flow of a job execution process according to the present embodiment.

In FIG. 8, the processes of #61 to #66 are the same as the aforementioned processes of #41 to #46. In other words, first, the job ID and password input screen is displayed in the display portion 21 (#61). When a job ID and password have been inputted by the user (Yes in #62), it is determined whether or not image data corresponding to the inputted job ID and password is stored in the hard disk 20d (#63).

In the case where corresponding image data is stored in the hard disk 20d (Yes in #63), the target image data is listed up (#64), and images based on that image data are printed onto paper (#65). In the case where the printing is not complete (No in #66), the printing process of #65 is continued.

Meanwhile, in the case where corresponding image data is not stored in the hard disk 20d (No in #63), it is determined whether or not image data is in the process of being received (#67).

In the case where image data is in the process of being received (Yes in #67), the controller 24 begins measuring time (#68). The warning screen mentioned above with reference to FIG. 4 is then displayed in the display portion 21 (#69).

Next, the job ID and password inputted in #62 are stored (held) (#70).

Here, in the case where the cancel button 21b has been pressed by the user (Yes in #71), the process returns to #61. However, in the case where the cancel button 21b has not been pressed by the user (No in #71), it is determined whether or not the reception of the image data has been completed or the apparatus has entered a state in which it is capable of comparison, or in other words, if the job ID and password information included in the image data has been received (#72).

In the case where the image data has been completely received, or the case where the job ID and password information included in the image data has been received (Yes in #72), it is determined whether or not a predetermined amount of time has elapsed since the controller 24 commenced the measurement (#73).

In the case where the predetermined amount of time has elapsed since the controller 24 commenced the measurement (Yes in #73), the process for comparing the job ID and password is cancelled (#74), and the process returns to #61.

However, in the case where the predetermined amount of time has not elapsed since the controller 24 commenced the measurement (No in #73), it is determined whether or not the received image data corresponds to the job ID and password stored in #70 (#75).

In the case where the received image data corresponds (Yes in #75), the aforementioned processes of #64, #65, and #66 are executed. However, in the case where the received image data does not correspond (No in #75), the process returns to #61. Note that the process may also return to #67 after the process of #75 (No in #75), rather than returning to #61.

Furthermore, although the above embodiment described a case where the image data corresponding to the user ID and password inputted by the user is stored in the hard disk 20d of the image forming apparatus 2, the image data may instead be stored in the management device 4.

In such a case, when a user ID and password have been inputted by the user, the controller 24 inquires with the management device 4 as to whether or not image data that can be compared with the user ID and password is present in the management device 4.

Then, in the case where image data that can be compared, or in other words, image data that includes a user ID and password, is present in the management device 4, the receiving portion 26 receives that image data from the management device 4.

If the received image data corresponds to the inputted user ID and password, the printing portion 20h prints images based on that image data onto paper.

However, in the case where image data that can be compared is not present in the management device 4, the controller 24 periodically makes the abovementioned inquiry to the management device 4. If image data that can be compared is stored in the management device 4, the receiving portion 26 receives that image data from the management device 4. If the received image data corresponds to the inputted user ID and password, the printing portion 20h prints images based on that image data onto paper.

Furthermore, although the comparison process is executed within the image forming apparatus 2 in the above embodiment, a password storage portion may be provided in the management device 4, and the comparison process may then be executed within the management device 4.

Further still, although the above embodiment describes a case where the predetermined authentication operation corresponds to the user input of a user ID and password using the operation panel 20f, an authentication device such as an IC card authentication device or a finger vein authentication device may be provided in the image forming apparatus 2, and the predetermined authentication operation may be performed using that authentication device.

Finally, in the case where the reception of the image data relating to the authentication print job has not been commenced at the point in time when the user has inputted a user ID and password, the user may be notified, via an email or the like, that the reception of the image data has commenced upon the reception of the image data commencing.

Note that the configuration, processing content, processing order, and so on of the image forming apparatus 2 in its entirety or the various constituent elements included therein may be altered as appropriate within the spirit of the present invention. The abovementioned unique and distinguished effects can be attained in such a case as well.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An image forming apparatus configured to execute an authentication print job, the authentication print job to be executed based on an authentication result, the image forming apparatus comprising:
   a receiver for receiving the authentication print job sent by a user;
   an image data storage portion for storing image data included in the authentication print job, the image data including second identification information;
   an accepting portion operation panel for receiving first identification information, the first identification information being inputted by the user;
   an identification information storage for storing the first identification information; and
   a hardware processor configure to:
   perform a first comparison between the first identification information and the second identification information to determine if the second identification information corresponds to the first identification information and whether or not image data having the second identification information that corresponds to the first identification information is stored in the image data storage;
   execute the authentication print job when the comparison has shown that the first identification information matches the second identification information;
   cause, after the first comparison determining that the image data having the second identification information that corresponds to the first identification information is not stored in the image data storage and in response to a determination that the image data is being received by the receiver, the identification information storage to store the first identification information while the authentication print job is in the process of being received by the receiver;
   wherein a second comparison by the hardware processor is performed after completion of reception of the authentication print job by the receiver to determine, via the second identification information included in the received image data, whether or not received image data included in the authentication print job received by the receiver corresponds to the first identification information stored in the identification information storage.

2. The image forming apparatus according to claim 1, wherein the identification information storage stores the first identification information until the receiver has completed reception of the authentication print job.

3. The image forming apparatus according to claim 1, wherein the first identification information is user identification information.

4. The image forming apparatus according to claim 3, wherein the user identification information is a user ID and a password.

5. The image forming apparatus according to claim 1, wherein the first identification information is job identification information and a password.

6. A job execution system configured to execute an authentication print job, the authentication print job to be executed based on an authentication result, the job execution system comprising:
   a receiver for receiving the authentication print job sent by a user;
   an image data storage for storing image data included in the authentication print job, the image data including second identification information;
   an operation panel for receiving first identification information, the first identification information being inputted by the user;
   an identification information storage for storing the first identification information; and
   a hardware processor configure to:
   perform a first comparison between the first identification information and the second identification information to determine if the second identification information corresponds to the first identification information and whether or not image data having the second identification information that corresponds to the first identification information is stored in the image data storage;
   execute the authentication print job when the first comparison has shown that the first identification information matches the second identification information; an identification information storage portion storing the first identification information; and
   cause, after the first comparison determining that the image data having the second identification information that corresponds to the first identification information is not stored in the image data storage portion, and in response to a determination that the image data is being received by the receiver the identification information storage to store the first identification information while the authentication print job is in the process of being received by the receiving portion receiver;

wherein a second comparison by the hardware processor is performed after completion of reception of the authentication print job by the receiver to determine, via the second identification information included in the received image data, whether or not received image data included in the authentication print job received by the receiver corresponds to the first identification information stored in the identification information storage portion.

7. The job execution system according to claim 6, wherein the identification information storage stores the first identification information until the receiver has completed reception of the authentication print job.

8. The job execution system according to claim 6, wherein the first identification information is user identification information.

9. The job execution system according to claim 8, wherein the user identification information is a user ID and a password.

10. The job execution system according to claim 6, wherein the first identification information is job identification information and a password.

11. A job execution method configured to execute an authentication print job, the authentication print job to be executed based on an authentication result, the job execution method comprising:

a receiving step of receiving the authentication print job sent by a user;

an accepting step of receiving first identification information, the first identification information being inputted by the user;

an identification information storage step of storing the first identification information to enable a first comparison between the first identification information and second identification information, the second identification information being included in image data included in the authentication print job;

a first comparison step of performing the first comparison between the first identification information and the second identification information to determine if the second identification information corresponds to the first identification information and whether or not image data having the second identification information that corresponds to the first identification information is stored; and an execution step of executing the authentication print job when the first comparison has shown that the first identification information matches the second identification information; wherein after the first comparison determining that the image data having the second identification information that corresponds to the first identification information is not stored and in response to a determination that the image data is being received, the identification information storage step stores the first identification information while the authentication print job is in the process of being received; and a second comparison step is performed after completion of reception of the authentication print job to determine, via the second identification information included in the received image data, whether or not received image data included in the authentication print job corresponds to the stored first identification information.

12. The job execution method according to claim 11, wherein the identification information storage step includes storing the first identification information until reception of the authentication print job has been completed.

13. The job execution method according to claim 11, wherein the first identification information is user identification information.

14. The job execution method according to claim 13, wherein the user identification information is a user ID and a password.

15. The image forming apparatus according to claim 11, wherein the first identification information is job identification information and a password.

* * * * *